(12) United States Patent
Peterson

(10) Patent No.: US 7,079,706 B2
(45) Date of Patent: Jul. 18, 2006

(54) METHODS AND APPARATUS FOR GENERATING A MULTIPLE COMPOSITE IMAGE

(76) Inventor: Paul Peterson, 9 Clay Ct., Montgomery, IL (US) 60538

( * ) Notice: Subject to any disclaimer, the term of this patent is extended or adjusted under 35 U.S.C. 154(b) by 708 days.

(21) Appl. No.: 09/885,746

(22) Filed: Jun. 20, 2001

(65) Prior Publication Data

US 2002/0196368 A1 Dec. 26, 2002

(51) Int. Cl.
*G06K 9/36* (2006.01)

(52) U.S. Cl. .......................... 382/284; 345/629; 348/36
(58) Field of Classification Search ................ 382/284, 382/305, 294, 312; 345/629, 630, 428, 540; 348/36, 239
See application file for complete search history.

(56) References Cited

U.S. PATENT DOCUMENTS

| | | | |
|---|---|---|---|
| 5,117,283 A * | 5/1992 | Kroos et al. ................. | 348/564 |
| 5,267,030 A | 11/1993 | Giorgianni et al. | |
| 5,272,549 A | 12/1993 | McDonald | |
| 5,452,111 A | 9/1995 | Giorgianni et al. | |
| 5,488,451 A | 1/1996 | Goggins ...................... | 355/77 |
| 5,488,508 A | 1/1996 | Haseltine | |
| 5,539,453 A * | 7/1996 | David et al. ................... | 348/77 |
| 5,543,964 A | 8/1996 | Taylor et al. ................ | 359/463 |
| 5,554,432 A | 9/1996 | Sandor et al. .............. | 428/157 |
| 5,587,740 A * | 12/1996 | Brennan ...................... | 348/373 |
| 5,611,693 A | 3/1997 | Chaya et al. | |
| 5,626,998 A | 5/1997 | Grabowski et al. | |
| 5,731,883 A | 3/1998 | Morton et al. | |
| 5,786,823 A | 7/1998 | Madden et al. | |
| 5,847,808 A | 12/1998 | Goggins ....................... | 355/22 |
| 5,886,818 A * | 3/1999 | Summer et al. ............ | 359/478 |
| 5,896,230 A | 4/1999 | Goggins ...................... | 359/619 |
| 5,924,870 A | 7/1999 | Brosh et al. ................ | 434/365 |
| 5,966,506 A | 10/1999 | Morton ........................ | 395/109 |
| 6,026,215 A | 2/2000 | Fantone et al. ............. | 395/102 |
| 6,084,978 A | 7/2000 | Taylor et al. ............... | 382/154 |
| 6,091,482 A | 7/2000 | Carter et al. .................. | 355/79 |
| 6,108,104 A | 8/2000 | Tesavis | |
| 6,148,148 A | 11/2000 | Wain et al. | |
| 6,185,042 B1 | 2/2001 | Lomb et al. | |
| 6,225,546 B1 | 5/2001 | Kraft et al. | |
| 6,258,194 B1 | 7/2001 | Danon | |
| 6,266,068 B1 * | 7/2001 | Kang et al. .................. | 345/629 |
| 6,301,385 B1 | 10/2001 | Chen et al. | |
| 6,324,545 B1 | 11/2001 | Morag | |
| 6,329,987 B1 * | 12/2001 | Gottfried et al. ........... | 345/419 |
| 6,400,374 B1 * | 6/2002 | Lanier ......................... | 345/630 |
| 6,400,832 B1 * | 6/2002 | Sevigny ....................... | 382/103 |
| 6,429,892 B1 * | 8/2002 | Parker .......................... | 348/77 |
| 6,507,361 B1 * | 1/2003 | Barber ..................... | 348/207.2 |
| 6,542,646 B1 | 4/2003 | Bar-Yona | |

(Continued)

OTHER PUBLICATIONS

International Search Report for PCT/US02/19190 dated Sep. 18, 2002.

(Continued)

*Primary Examiner*—Kanjibhai Patel
(74) *Attorney, Agent, or Firm*—Marshall, Gerstein & Borun LLP

(57) ABSTRACT

A composite image generator for combining a prestored composite background image, a prestored composite foreground image, and a composite interior image is disclosed. The composite interior image is preferably generated by the composite image generator by interlacing a prestored interior image with a captured digital image. Portions of the composite background image are deleted or hidden based on the composite interior image. Similarly, portions of the composite interior image are deleted or hidden based on the composite foreground image.

20 Claims, 8 Drawing Sheets

U.S. PATENT DOCUMENTS

| | | |
|---|---|---|
| 6,549,295 B1 | 4/2003 | Fantone et al. |
| 6,571,271 B1 | 5/2003 | Savitzky et al. |
| 6,619,860 B1 | 9/2003 | Simon |
| 6,814,509 B1 | 11/2004 | Ashizaki |
| 2001/0015753 A1 | 8/2001 | Myers |
| 2002/0021832 A1 | 2/2002 | Dawson |

OTHER PUBLICATIONS

General Outline of IMorph Business Plan dated Feb. 20, 2001.

Lenticular Technical Requirements from Virtual Graphics (visited Feb. 20, 2001) <http://www.3dpromo.com/Technical_Requirements.htm>.

Lenticular 3D Magic by ProMagic (visited Feb. 20, 2001) <http://www.promagic.net/promagic/magic.html>.

Lenticular FlashBand Generator by ProMagic (visited Feb. 20, 2001) <http:www.promagic.net/promagic/flashband.html>.

ProMagic Lenticular Development Software—Body Section (visited Feb. 20, 2001) <http:www.promagic.net/body.html>.

"An Art Form That's Precise but Friendly Enough to Wink" (visited Feb. 20, 2001) <http://www.depthography.com/times.html>.

"Visual Quickstart Guide: Photoshop for Windows and Macintosh", copyright 2001 by Elaine Weinmann and Peter Lourekas, published by Peachpit Press.

* cited by examiner

METHODS AND APPARATUS FOR GENERATING A MULTIPLE COMPOSITE IMAGE

TECHNICAL FIELD

The present invention relates in general to digital imaging and, in particular, to methods and apparatus for generating a multiple composite image.

BACKGROUND

Creating a three dimensional effect by placing a lenticular surface over a composite image is well known (see U.S. Pat. No. 5,543,964 and U.S. Pat. No. 5,924,870 both incorporated herein by reference). Lenticular images are frequently used by advertisers in the form of posters, compact disk covers, video tape covers, video game covers, etc.

However, due to the time and expense associated with creating a lenticular image in the traditional manner, prior art uses of lenticular images is primarily limited to businesses with large advertising budgets. The average consumer is unable to purchase a "novelty" lenticular image. Practically speaking, customers cannot purchase an inexpensive lenticular image which includes a digital photograph of the customer incorporated into a customer selected theme. For example, while at an amusement park, a customer may wish to purchase a lenticular image which includes a picture of his children and selected characters associated with the amusement park.

In addition, prior art methods require all of the images used in the composite image to be available prior to the interlacing process. However, the interlacing process can be time consuming. As a result, services which create a composite image incorporating a digital image of the customer taken at the point of purchase while the customer waits may be impractical.

SUMMARY OF THE INVENTION

A method and apparatus for generating a multiple composite image is disclosed. The apparatus includes the equipment adapted to perform the method steps of interlacing a plurality of background images to produce a composite background image, interlacing a plurality of foreground images to produce a composite foreground image, capturing a digital image of a subject, and interlacing the digital image with an interior image to produce a composite interior image. The three composite images are then combined to create the multiple composite image. The multiple composite image may optionally be printed and joined with a lenticular covering to produce a "three-dimensional" type lenticular "novelty" item.

BRIEF DESCRIPTION OF THE DRAWINGS

Features and advantages of the disclosed system will be apparent to those of ordinary skill in the art in view of the detailed description of exemplary embodiments which is made with reference to the drawings, a brief description of which is provided below.

DETAILED DESCRIPTION OF EXEMPLARY EMBODIMENTS

In general, a composite image generator for combining a prestored composite background image, a prestored composite foreground image, and a composite interior image is disclosed. The composite interior image is preferably generated by the composite image generator by interlacing a prestored interior image with a captured digital image. Portions of the composite background image are deleted or hidden based on the composite interior image. Similarly, portions of the composite interior image are deleted or hidden based on the composite foreground image.

Figure 1:
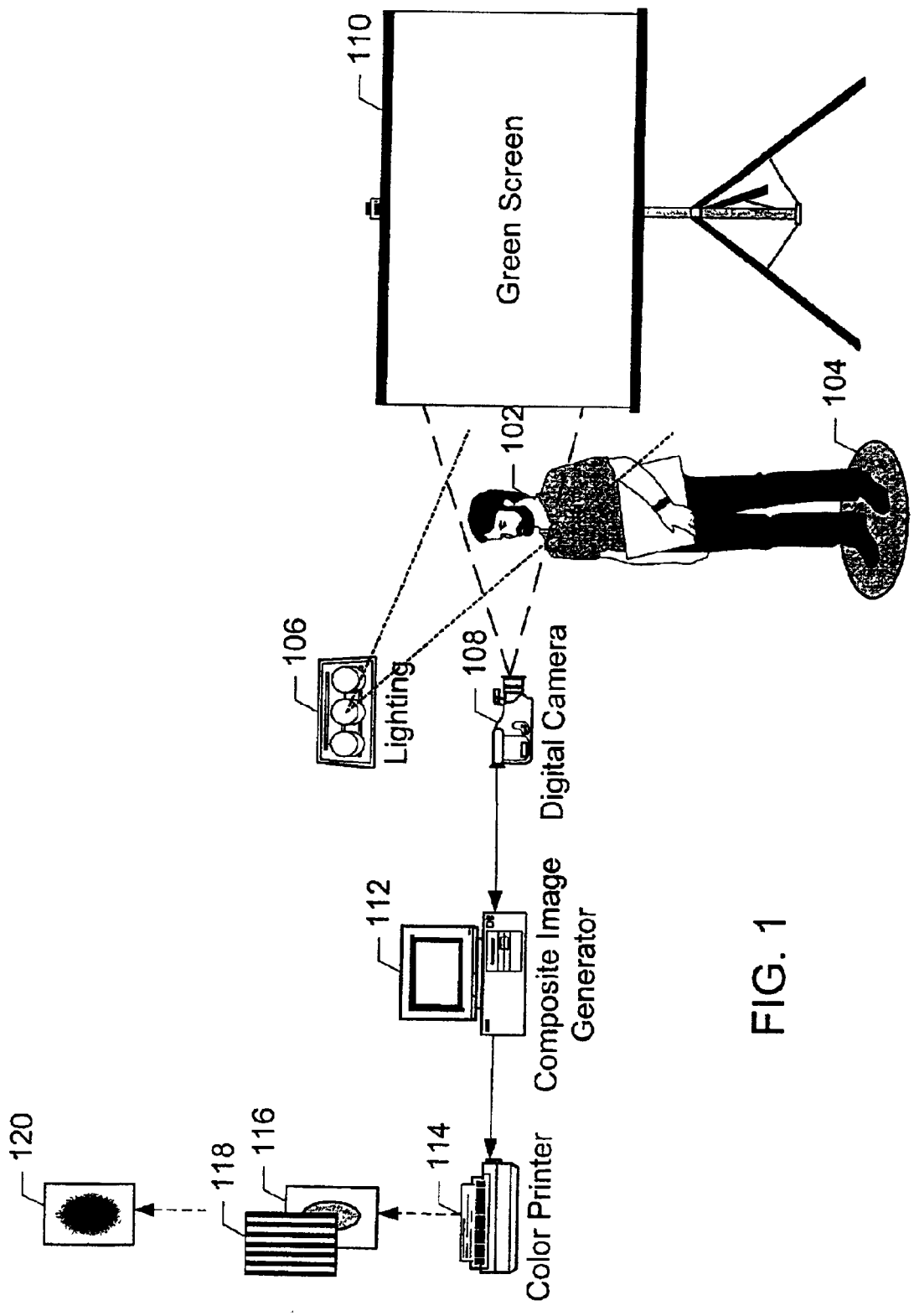
FIG. 1 is a high level block diagram of a retail point of purchase system illustrating an exemplary environment of use for the disclosed system.

A high level block diagram of a retail point of purchase system illustrating an exemplary environment of use for the disclosed system is illustrated in FIG. 1. In a preferred embodiment, a person 102 is positioned at a predetermined location 104. Preferably, the predetermined location 104 is located a certain distance from a light 106, a digital camera 108, and a backdrop 110. The light 106 may be any type of light, such as an incandescent light and/or a camera flash. The digital camera 108 may be any type of digital camera, such as a digital still camera and/or a digital video camera. Preferably, the digital camera 108 is a high resolution digital camera. Preferably, the backdrop 110 is a solid color, such as green.

Once the person 102 is properly positioned, one or more digital images are captured by the digital camera 108. The captured digital images are then transferred to a composite image generator 112. In the preferred embodiment, the composite image generator 112 is a personal computer programmed to generate composite images using a captured digital image and selected theme images as described in detail below. A composite image is an image which includes two or more interlaced frames. To a person viewing the composite image, the frames are visually separated from each other by a lenticular surface.

Each composite image generated by the composite image generator 112 is then printed on a printer 114 to produce a printed image 116. Any type of printer 114, such as a ink jet printer, a dot matrix printer, or a laser printer, may be used. In the preferred embodiment, a high resolution color printer is used. The paper the image is printed on may be any type of paper. Preferably, a heavy stock white paper is used.

A lenticular sheet 118 is then affixed to the printed image 116 to produce a "three dimensional" lenticular novelty item 120. Any type of lenticular sheet 118 may be used. Preferably, the width of the lenses in the lenticular sheet 118 allows for an integer number of dots to be printed by the printer 114 under each lens. Preferably, the lenticular sheet 118 is made of plastic and includes adhesive which may be exposed by peeling back a disposable layer of material.

Figure 2:
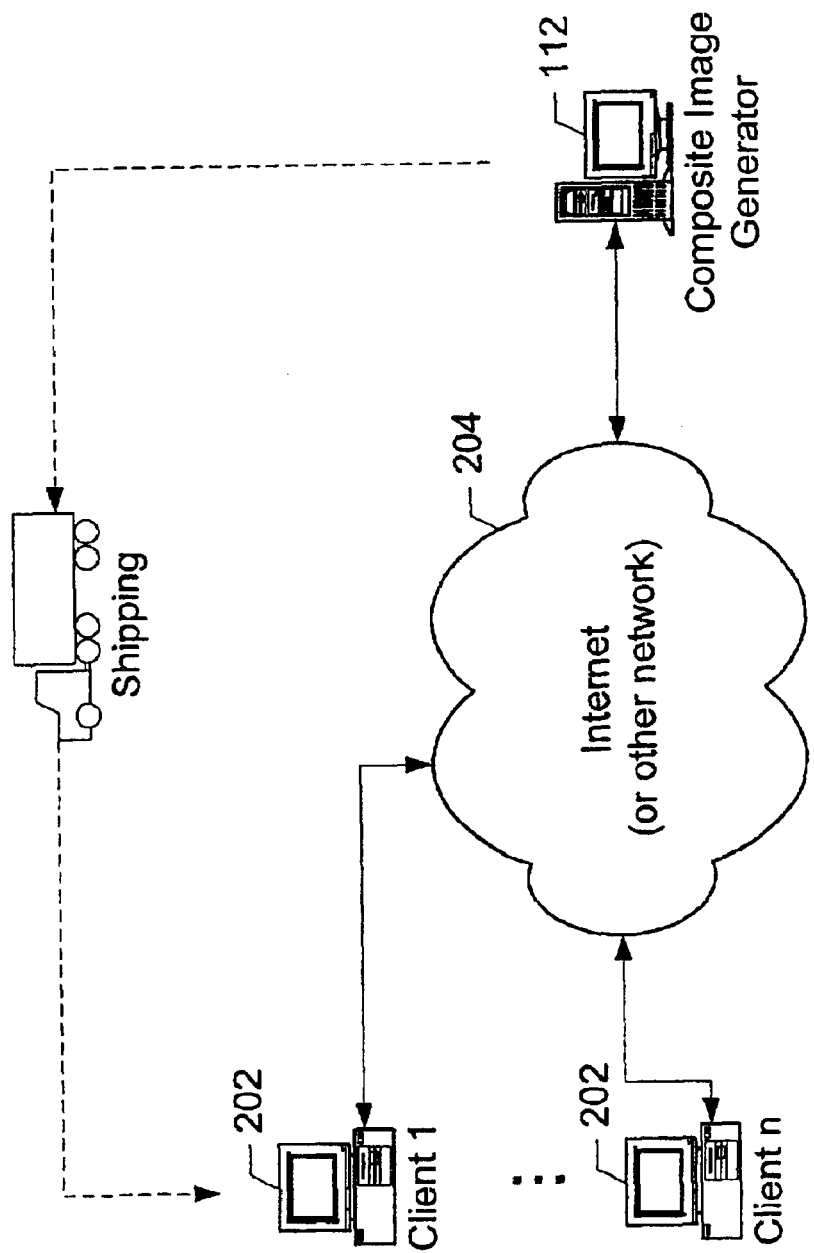
FIG. 2 is a high level block diagram of a communications system illustrating an exemplary environment of use for the disclosed system.

A high level block diagram of a communications system illustrating an exemplary environment of use for the disclosed system is illustrated in FIG. 2. Typically, the system includes one or more client devices 202 and one or more composite image generators 112. Each of these devices may communicate with each other via a connection to the Internet or some other wide area network 204.

Typically, a composite image generator 112 stores a plurality of files, programs, and/or web pages for use by the client devices 202. One composite image generator 112 may handle requests from a large number of clients 202. Accordingly, each composite image generator 112 is typically a high end computer with a large storage capacity, one or more fast microprocessors, and one or more high speed network connections. Conversely, relative to a typical composite image generator 112, each client device 202 typically includes less storage capacity, a single microprocessor, and a single network connection.

Figure 3:
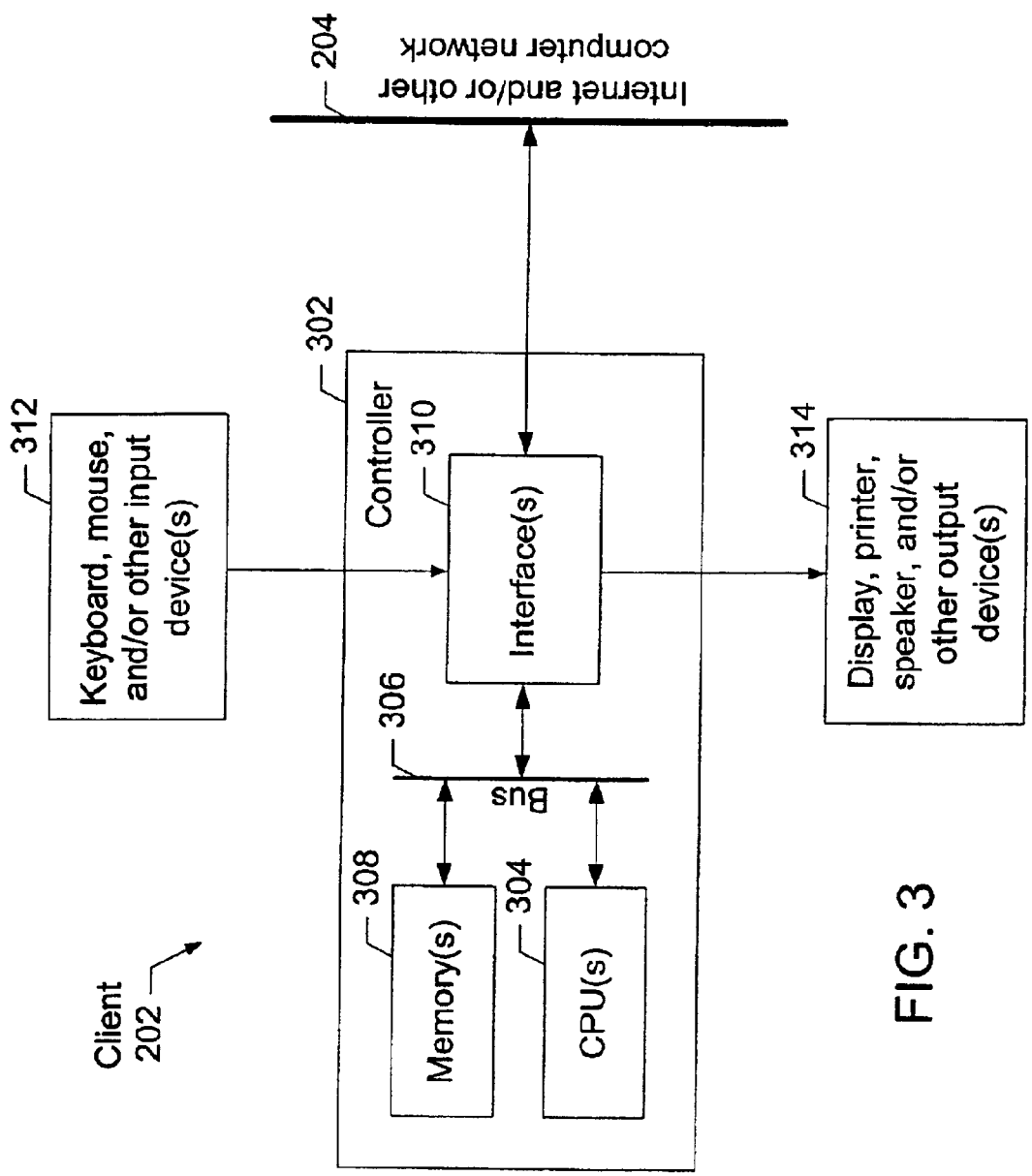
FIG. 3 is a more detailed block diagram of one of the client devices illustrated in FIG. 1.

A more detailed block diagram of a client device 202 is illustrated in FIG. 3. Preferably, the client device 202 is a personal computer (PC). However, a person of ordinary skill in the art will readily appreciate that many different computing devices may be programmed to perform the functions of the client device 202. The client 102 includes a controller 302 which preferably includes a central processing unit 304 electrically coupled by an address/data bus 306 to a memory device 308 and an interface circuit 310. The CPU 304 may be any type of well known CPU, such as an Intel Pentium™ processor. The memory device 308 preferably includes volatile memory and non-volatile memory. Preferably, the memory device 308 stores a software program that interacts with the composite image generator 112 as described below. This program may be executed by the CPU 304 in a well known manner. The memory device 308 may also store digital data indicative of documents, files, programs, web pages, etc. retrieved from a composite image generator 112 and/or loaded via an input device 312.

The interface circuit 310 may be implemented using any type of well known interface standard, such as an Ethernet interface and/or a Universal Serial Bus (USB) interface. One or more input devices 312 may be connected to the interface circuit 310 for entering data and commands into the controller 302. For example, the input device 312 may be a keyboard, mouse, touch screen, track pad, track ball, isopoint, and/or a voice recognition system.

One or more displays, printers, speakers, and/or other output devices 314 may also be connected to the controller 302 via the interface circuit 310. The display 314 may be cathode ray tube (CRTs), liquid crystal displays (LCDs), or any other type of display. The display 314 generates visual displays of data generated during operation of the client 202. The display 314 is typically used to display web pages received from the composite image generator 112. The visual displays may include prompts for human operator input, still graphics and/or animations representing theme choices, still graphics and/or animations representing generated composite images, run time statistics, calculated values, detected data, etc.

The client 202 may also exchange data with other devices via a connection to the network 204. The network connection may be any type of network connection, such as an Ethernet connection, digital subscriber line (DSL), telephone line, coaxial cable, etc. Users of the system may be required to register with the composite image generator 112. In such an instance, each user may choose a user identifier and a password which may be required for the activation of services. The user identifier and password may be passed across the network 204 using encryption built into the user's browser. Alternatively, the user identifier and/or password may be assigned by the composite image generator 112.

Figure 4:
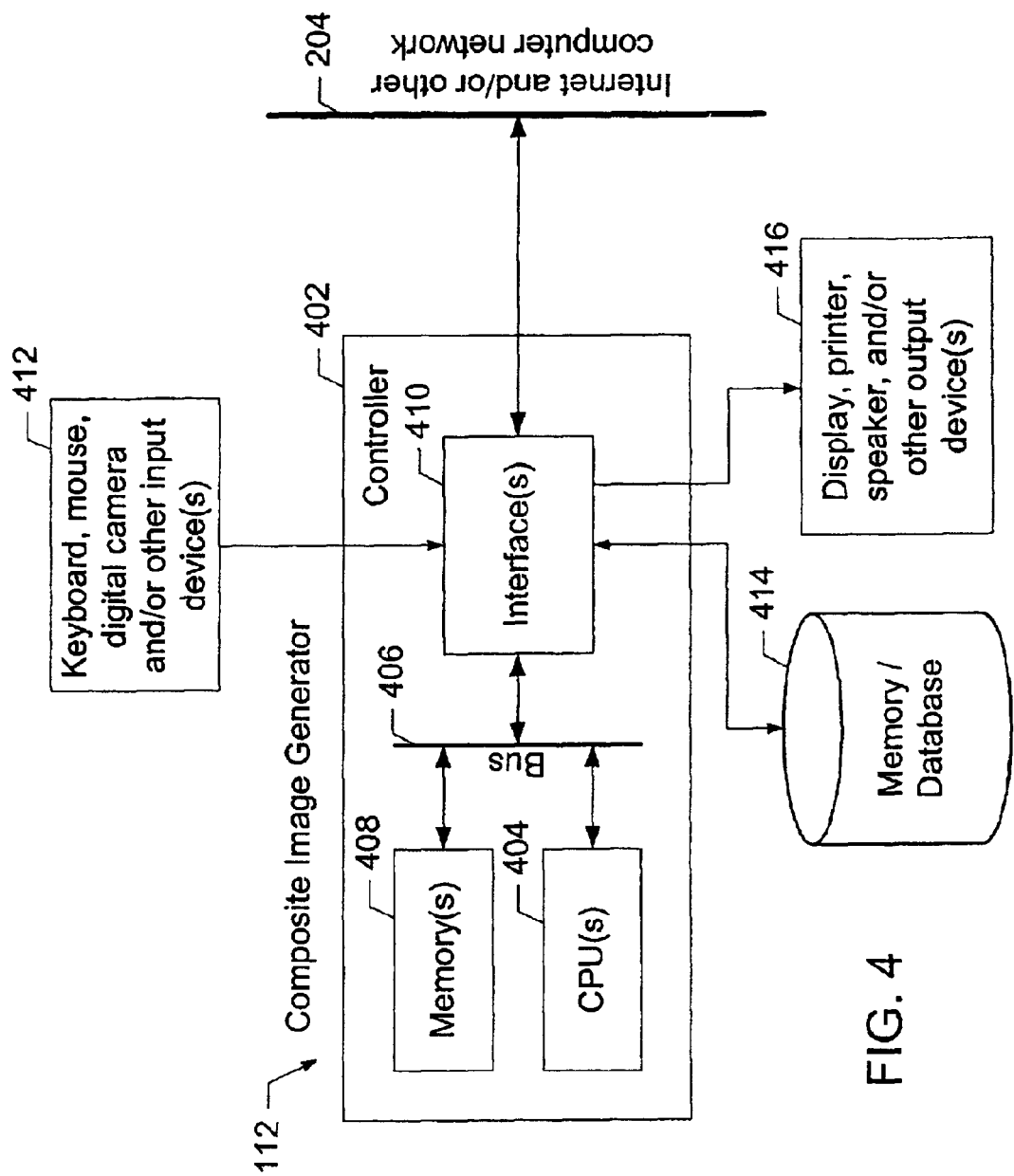
FIG. 4 is a more detailed block diagram showing one embodiment of the composite image generator illustrated in FIG. 1.

A more detailed block diagram of a composite image generator 112 is illustrated in FIG. 4. Like the client device 202, the controller 402 in the composite image generator 112 preferably includes a central processing unit 404 electrically coupled by an address/data bus 406 to a memory device 408 and an interface circuit 410. However, the controller 402 in the composite image generator 112 is typically more powerful than the client controller 302. Again, the CPU 404 may be any type of well known CPU, such as an Intel Pentium™ processor, and the memory device 408 preferably includes volatile memory and non-volatile memory.

Preferably, the memory device 408 stores a software program that implements all or part of the method described below. This program may be executed by the CPU 404 in a well known manner. However, some of the steps described in the method below may be performed manually or without the use of the composite image generator 112. The memory device 408 and/or a separate database 414 also store files, programs, web pages, etc. for use by the composite image generator 112 and/or the client devices 202.

One or more input devices 412 may be connected to the interface circuit 410 for entering data and commands into the controller 402. For example, the input device 412 may be a keyboard, mouse, digital camera, touch screen, track pad, track ball, isopoint, and/or a voice recognition system.

One or more displays, printers, speakers, and/or other output devices 416 may also be connected to the controller 402 via the interface circuit 410. Like the client device 202, the display 416 may be cathode ray tube (CRTs), liquid crystal displays (LCDs), or any other type of display. The display 416 generates visual displays of data generated during operation of the composite image generator 112. The visual displays may include prompts for human operator input, still graphics and/or animations representing theme choices, still graphics and/or animations representing generated composite images, run time statistics, calculated values, detected data, etc.

The composite image generator 112 may exchange data with other devices via a connection to the network 204. The interface circuit 410 may be implemented using any data transceiver, such as an Ethernet transceiver. The network 204 may be any type of network, such as a local area network (LAN) and/or the Internet.

Figure 5:
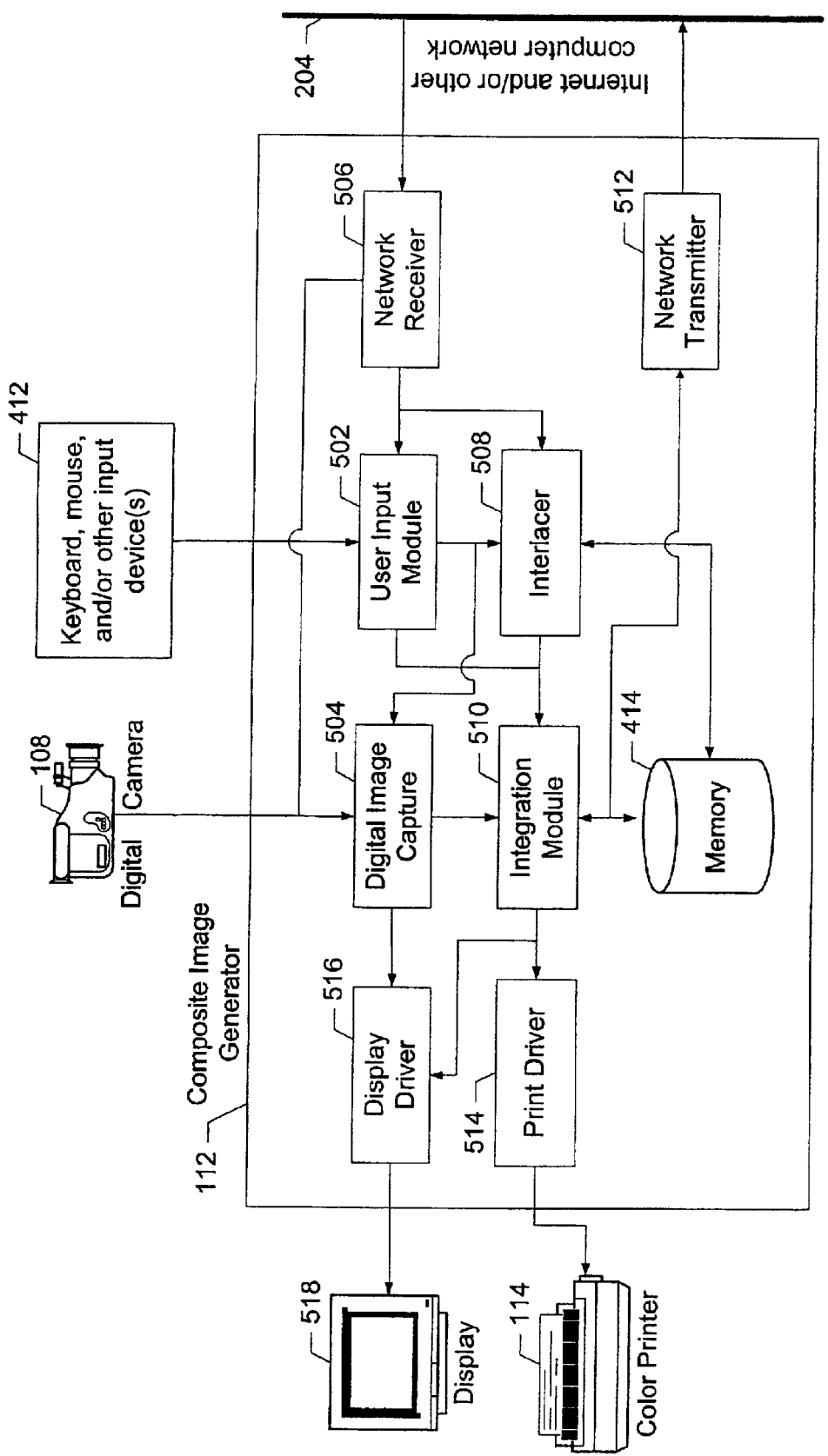
FIG. 5 is a more detailed block diagram showing another embodiment of the composite image generator illustrated in FIG. 1.

A more detailed block diagram of another embodiment of the composite image generator 112 is illustrated in FIG. 5. In this embodiment, the composite image generator 112 includes a plurality of interconnected modules 502–516. Preferably, each of the modules 502–516 is operatively coupled to each of the other modules 502–516. Each of the modules may be implemented by a microprocessor executing software instructions and/or conventional electronic circuitry. In addition, a person of ordinary skill in the art will readily appreciate that certain modules may be combined or divided according to customary design constraints.

For the purpose of receiving user inputs, the composite image generator 112 includes a user input module 502. The user input module 502 is operatively coupled to one or more input devices 412. The user input module 502 may be implemented using any well known interface standard such as a USB interface. The user input module 502 preferably accepts inputs from a customer and/or an operator. For example, the user input module 502 preferably accepts inputs from a customer or an operator indicative of a customer selection. The customer selection may identify one of a plurality of predetermined themes. In a preferred embodiment, a graphical user interface showing graphical representations of a plurality of predetermined themes is displayed to facilitate a theme selection.

In addition, the user input module 502 may receive alignment inputs. The alignment inputs cause a change in relative proximity of a captured digital image and an associated background image, foreground image, and/or interior image. In other words, alignment inputs facilitate alignment of the various layers which make up the final composite image.

For the purpose of capturing a digital image, the composite image generator 112 includes a digital image capture module 504. The digital image capture module 504 is operatively coupled to the digital camera 108. The digital image capture module 504 preferably captures a digital image at the point of purchase.

For the purpose of storing and retrieving digital data, the composite image generator 112 includes a memory device 414. The memory device 414 is operatively coupled to the user input module 502. The memory device preferably stores a plurality of themes, including the identified theme. Preferably, the identified theme includes a foreground image, an interior image, and a background image. The foreground image and/or the background image may be stored as composite images or non-composite images prior to use in a final composite image. Preferably, the interior image is stored as a non-composite image to be interlaced with a captured image. The memory device 414 may also store captured digital images, web pages, software programs, and other data files.

For the purpose of receiving web page requests, digital images, theme data, theme selections, alignment inputs, and other data, the composite image generator 112 includes a network receiver 506. The network receiver 402 is operatively coupled to the network 204 and the other modules of the composite image generator 112 in a well known manner. For example, the network receiver 506 may be an Ethernet interface circuit electrically coupled to the Internet via an Ethernet cable.

For the purpose of interlacing images, the composite image generator 112 includes an interlacer 508. The interlacer 508 is operatively coupled to the memory device 414, the user input module 502, the digital image capture module 504 and/or the network receiver 506. The interlacer 508 generates a composite image from two or more digital images by merging slices of the digital images in a well known manner. Preferably, the interlacer 508 receives an interior image associated with the selected theme from the memory device 414. In addition, the interlacer 508 preferably receives a captured digital image (e.g., a person's face) from at least one of the user input module 502, the digital image capture module 504 and/or the network receiver 506. The interlacer 508 preferably generates a composite interior image by interlacing the interior image associated with the selected theme and the captured digital image. The interlacer 508 may also be used to interlace background images, foreground images, and/or previously combined images.

For the purpose of combining digital images, the composite image generator 112 includes an integration module 510. The integration module 510 is operatively coupled to the memory module 414, the digital image capture module 504, and the interlacer 508. The integration module 510 combines composite and/or non-composite images. In the preferred embodiment, the integration module 510 combines a composite background image, a composite interior image, and a composite foreground image to create a multiple composite image. The composite background image and the composite foreground image preferably belong to a selected theme. The composite interior image is preferably generated by interlacing a non-composite interior image belonging to the selected theme with a captured digital image. In addition, any image may be annotated with user input text.

The integration module 510 combines images by deleting or hiding pixels which are "behind" other pixels. "Visible" pixels in one layer cause pixels in the same position in a lower layer to be hidden or deleted. "Invisible" pixels do not cause pixels below to be hidden or deleted. For example, in the preferred embodiment, a digital image of a person 102 in front of a green screen 110 is captured. The system uses the large number of green pixels to find the outline of the person 102 in a well known manner. Pixels outside the outline of the person 102 are considered "transparent." In other words, background image pixels are deleted where ever there is a person 102 in the interior image and background pixels remain wherever the green screen is captured in the interior image. In other words, the green pixels are removed and the background pixels in the same positions are kept for the combined image. Similarly, a foreground image with pixels predefined as "transparent" is preferably created. For example, a text message may be shown in the foreground image with all other pixels from the foreground image being "transparent" to the interior image and the background image.

If three layers are combined (e.g., a background, an interior, and a foreground), the integration module 510 preferably deletes a portion of the background image to create a specialized background image and a portion of the interior image to create a specialized interior image. The portion of the background image deleted is preferably dependant on the interior image as described above. The portion of the interior image deleted is preferably dependant on the foreground image as described above. The three layers are then combined in a well known manner. Of course, a person of ordinary skill in the art will readily appreciate that any number of layers may be combined. In order to save processing time, the background image and the foreground image may be interlaced prior to capturing the digital image used in the interior image.

Once a final composite image is created, the final composite image may be output in one or more ways. The final composite image may be transmitted over the network 204 using a network transmitter 512. The final composite image may be printed on a printer 114 via a print driver 514. The final composite image may be displayed on a display device 518 via a display driver 516.

The network transmitter 512 may be any type of well known network transmitter, such as an Ethernet transmitter. The network transmitter 512 may also be used to transmit web pages and other data to a client device 202. For example, the network transmitter 512 may transmit plurality of graphic images indicative of a plurality of predetermined theme choices to facilitate theme selection by a remote user. The network transmitter 512 may also transmit a plurality of two dimensional frames sequenced to produce a three dimensional illusion representing a composite image.

The printer 114 may be any type of well known printer, such as an ink jet printer, a dot matrix printer, or a laser printer. In a preferred embodiment, printing of the final composite image occurs within minutes after a digital image incorporated into the final composite image is captured at the point of purchase. In addition, the printer 114 preferably prints a lenticular registration mark on the printed image 116. The lenticular registration mark facilitates rotational positioning of the lenticular surface 118 on the printed image 116 and axial positioning of the lenticular surface 118 on the printed image 116. Rotational positioning ensures that the parallel lenses in the lenticular surface 118 line up with the interlaced frames in the composite image. Axial positioning is left/right positioning or up/down positioning to place the center frame (e.g., frame six) at the center viewing angle (i.e., perpendicular to the surface). In a preferred embodiment, the lenticular registration mark comprises a plurality of parallel lines, wherein each of the lines is a different color.

The display device 518 may be any type of well known display device, such as a cathode ray tube (CRT) or a liquid crystal display (LCD). The display device 518 may also be used to display a graphical representation of each of the predetermined themes to facilitate theme selection via a graphical user interface (GUI). The display device 518 may also be used to display a graphical representation of a background image, a captured digital image, and/or a foreground image. Adjustments to the relative alignment of these images may be made with the help of the display device 518. The display device 518 may also display a graphical representation of the final composite image. In a preferred embodiment, the composite image is displayed using a plurality of two dimensional frames sequenced to produce a three dimensional illusion.

Figure 6:
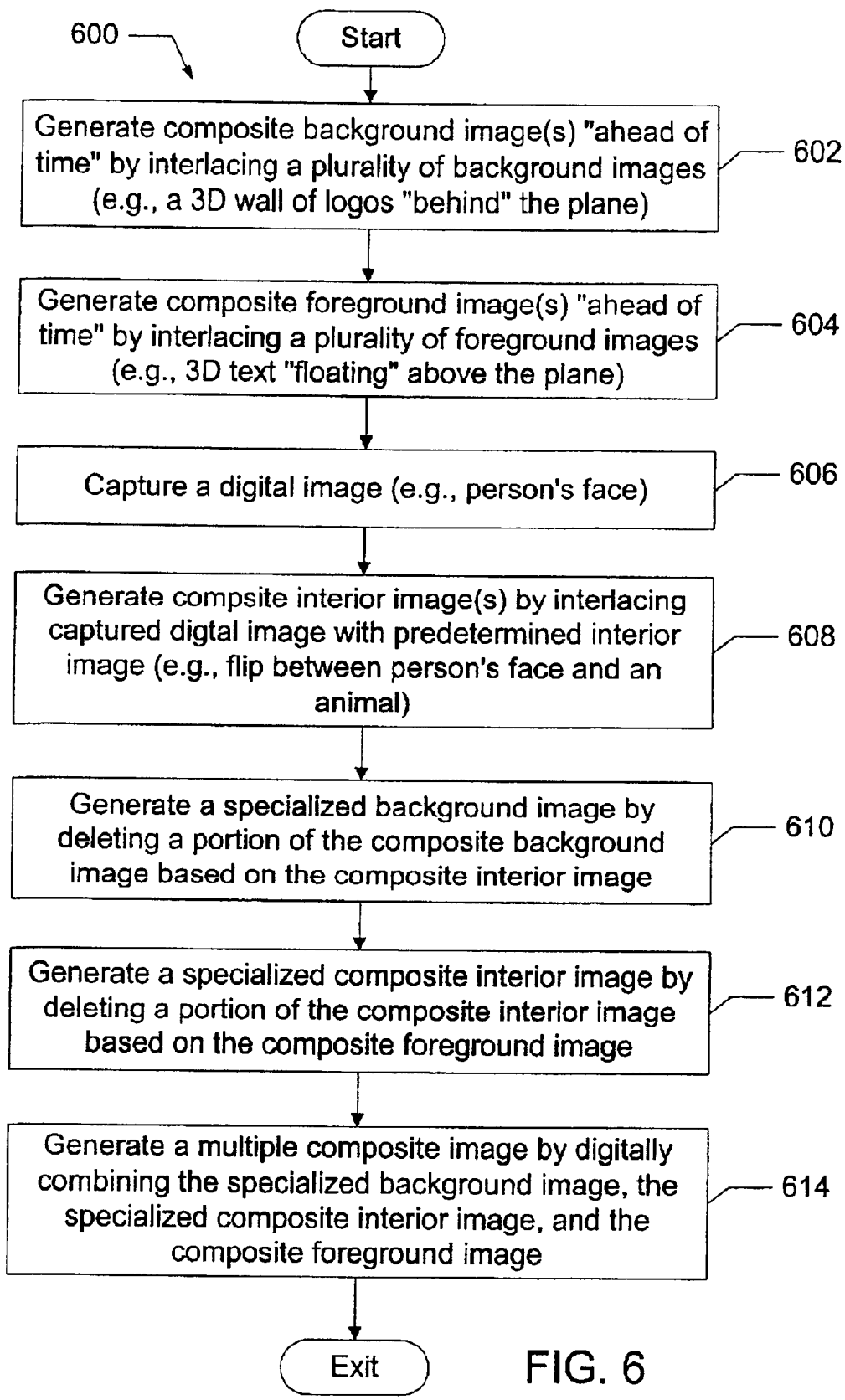
FIG. 6 is a flowchart of a process for generating a multiple composite image.

A flowchart of a process 600 for generating a multiple composite image is illustrated in FIG. 6. A multiple composite image is a composite image generated from other composite images. Preferably, the process 600 is embodied in a software program which is stored in a composite image generator memory 408, 414 and executed by the composite image generator CPU 404 in a well known manner. However, some or all of the steps of the process 600 may be performed manually and/or by another device. Although the process 600 is described with reference to the flowchart illustrated in FIG. 6, a person of ordinary skill in the art will readily appreciate that many other methods of performing the acts associated with process 600 may be used. For example, the order of many of the steps may be changed without departing from the scope or spirit of the present invention. In addition, many of the steps described are optional.

Generally, the process 600 causes the composite image generator 112 to combine a prestored composite background image, a prestored composite foreground image, and a composite interior image. The composite interior image is preferably generated by the composite image generator 112 by interlacing a prestored interior image with a captured digital image. Portions of the composite background image are deleted or hidden based on the composite interior image. Similarly, portions of the composite interior image are deleted or hidden based on the composite foreground image.

The process 600 begins when a plurality of composite background images are generated "ahead of time" (i.e., prior to digital image capture of the person 102 or other subject) by interlacing a plurality of non-composite background images (step 602). Preferably, at least one composite background image is generated for each of a plurality of themes. For example, if the multiple composite image (i.e., the end product) is to produce a three dimensional effect which includes a "wall" of logos behind the plane of the paper the image is printed on, a series of non-composite background images may include the logos in various positions. If twelve "frames" are being used in the multiple composite image, twelve non-composite background images may be used for each of the themes. Of course, any number of frames may be used (depending on printer resolution and lens size), and more than one frame may contain the same data.

Similarly, a plurality of composite foreground images are preferably generated "ahead of time" by interlacing a plurality of non-composite foreground images (step 604). Preferably, at least one composite foreground image is generated for each of the themes. For example, if the multiple composite image is to produce a three dimensional effect which includes text and/or graphics "floating" in front of the plane of the paper the image is printed on, a series of non-composite foreground images may include the text in various positions. Once the background images and the foreground images are interlaced, they may be used in any number of multiple composite images without the need to perform interlacing on the background images or the foreground images again.

Subsequently, one or more digital images are captured (step 606). For example, a person's face may be captured by a digital camera. The captured digital image may then be interlaced with a predetermined interior image to generate a composite interior image (step 608). Preferably, the predetermined interior image is part of a selected theme. The theme and/or the predetermined interior image may be selected before or after the digital image is captured. For example, an interior composite image which "flips" between the person's face and an animal may be generated by interlacing the captured image with a stock animal image. In such an instance, the same image may be repeated in adjacent frames (e.g., six frames of the person's face followed by six frames of the animal). Alternatively, more than one captured digital image may be interlaced. For example, the interior image may flip between a first person's face and a second person's face.

In order to prepare the images for combing, the composite image generator 112 generates a specialized background image by deleting a portion of the composite background image based on the composite interior image (step 610). Similarly, the composite image generator 112 preferably generates a specialized composite interior image by deleting a portion of the composite interior image based on the composite foreground image (step 612). The portions deleted or hidden are based on well known digital image layering techniques and are described in detail above.

Once the specialized composite background image, the specialized composite interior image, and the composite foreground image are determined, the composite image generator 112 combines the three layers in a well known manner (step 614). Of course, a person of ordinary skill in the art will readily appreciate that any number of layers may be combined.

Figure 7:
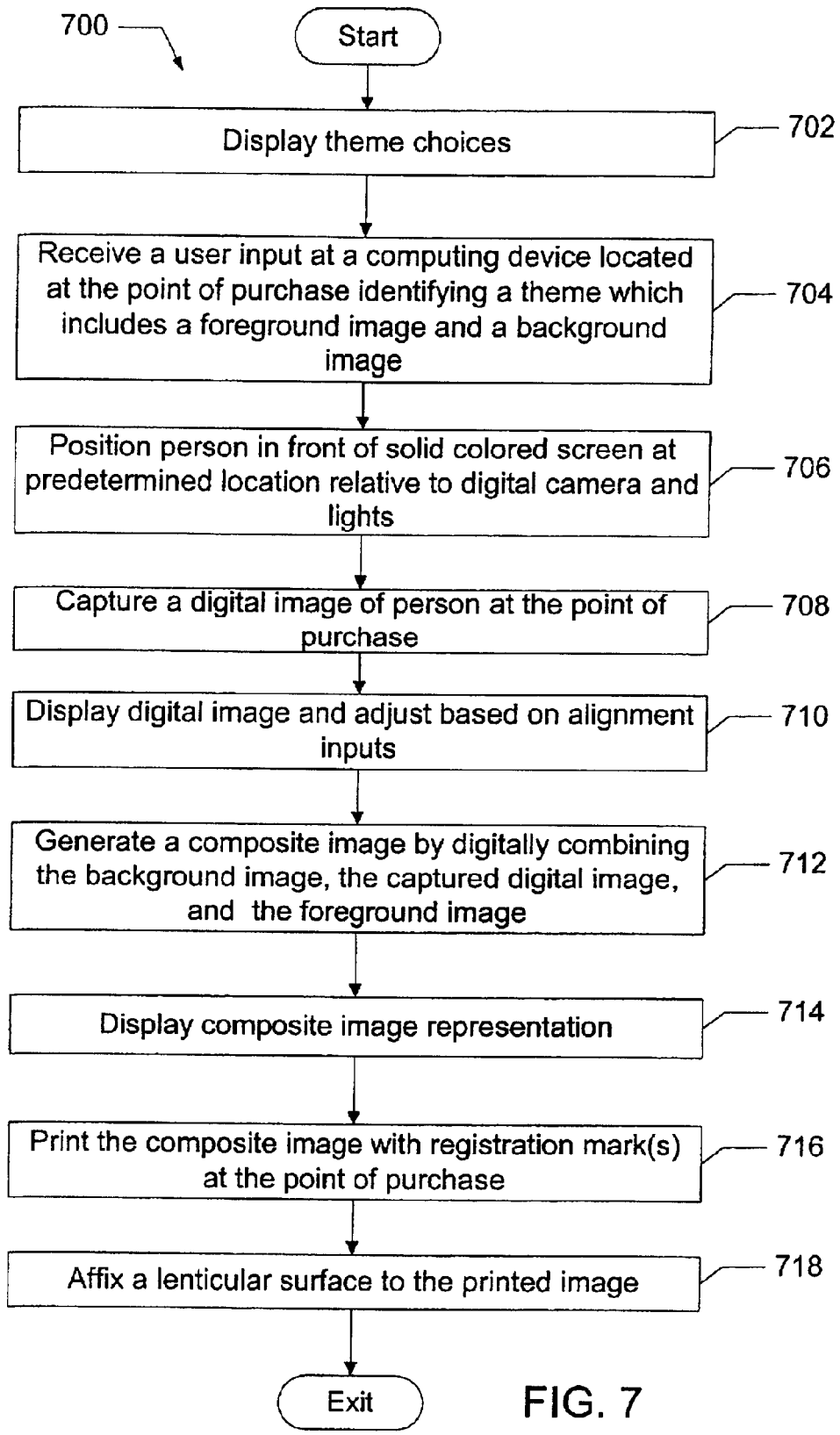
FIG. 7 is a flowchart of a process for producing a lenticular novelty item at a point of purchase.

A flowchart of a process 700 for producing a lenticular novelty item at a point of purchase is illustrated in FIG. 7. Preferably, the process 700 is embodied in a software program which is stored in a composite image generator memory 408, 414 and executed by the composite image generator CPU 404 in a well known manner. However, some or all of the steps of the process 700 may be performed manually and/or by another device. Although the process 700 is described with reference to the flowchart illustrated in FIG. 7, a person of ordinary skill in the art will readily appreciate that many other methods of performing the acts associated with process 700 may be used. For example, the order of many of the steps may be changed without departing from the scope or spirit of the present invention. In addition, many of the steps described are optional.

Generally, the process 700 causes the composite image generator 112 to receive a theme selection and a captured digital image. Images associated with the selected theme and the captured digital image are then interlaced and/or combined to produce a final composite image. The final composite image is printed and a lenticular surface 118 is applied to produce the lenticular novelty item 120 at a point of purchase.

The process 700 begins when the composite image generator 112 causes a display device 518 to display a plurality of theme choices (step 702). In the preferred embodiment, the theme choices include text and/or graphics indicative of the associated themes. For example, one theme choice may depict a lion while another theme choice depicts a bear. A user (i.e., a customer or an operator) may then select a theme by selecting one of the text and/or graphics representations (step 704). For example, a touch screen or mouse input may be used to select the text and/or graphics indicative of the associated theme. In another embodiment, a theme may be selected by entering a number or other code into the composite image generator 112. In such an instance, actual printed samples with lenses and theme numbers attached may be available for theme determination.

Before or after theme selection, a person 102 is preferably positioned in front of the backdrop 110 at the predetermined location 104 (step 706). Subsequently, a digital image of the person 102 is captured at the point of purchase using a scanner or digital camera 108 (step 708). Of course, in the event a scanner is used, a photo must be provided for scanning, and step 706 may be skipped. As described above, the digital camera 108 may be any type of digital camera, such as a digital still camera and/or a digital video camera. Theme selection prior to digital image capture allows for theme related posturing of the person 102. Theme selection after digital image capture allows for interactive on-screen theme selection which incorporates some or all of the captured digital image (i.e., previewing).

Once the digital image is captured, the image may be cropped or repositioned digitally to facilitate combing the digital image with other images from the selected theme. Accordingly, the composite image generator 112 preferably displays the captured digital image and adjusts the captured digital image based on alignment inputs (step 710). Preferably, alignment inputs are generated in response to arrow key depressions, mouse click and drag operations, and/or touch screen inputs.

Once the digital image is aligned (if necessary), the composite image generator 112 preferably generates a composite image by digitally combining a background image, the captured digital image, and a foreground image (step 712). Preferably, the background image and the foreground image belong to the selected theme. In addition, the captured digital image is preferably interlaced with an interior image from the selected theme.

Optionally, the composite image generator 112 may display a representation of the composite image (step 714). In one embodiment, animation is used to simulate the appearance of the composite image after the composite image is printed and placed under a lenticular surface. For example, if twelve frames are interlaced in the composite image, a twelve frame animation is preferably produced. In such an instance, a slider or other control may be available through the GUI to allow the user to move from frame to frame. In another embodiment, a single image representing the composite image is displayed (e.g., one of the frames).

Once the composite image is generated, the composite image is preferably printed at the point of purchase using a high resolution color printer 114 (step 716). Preferably, the printed image 116 includes registration marks of different colors as described above. By using different colors, the center frame (e.g., frame six), may be positioned for a perpendicular viewing angle, thereby leaving approximately half of the frames to the "left" and half of the frames to the "right." Subsequently, a lenticular surface 118 is attached to the printed image 116 to produce the lenticular novelty item (step 718).

Figure 8:
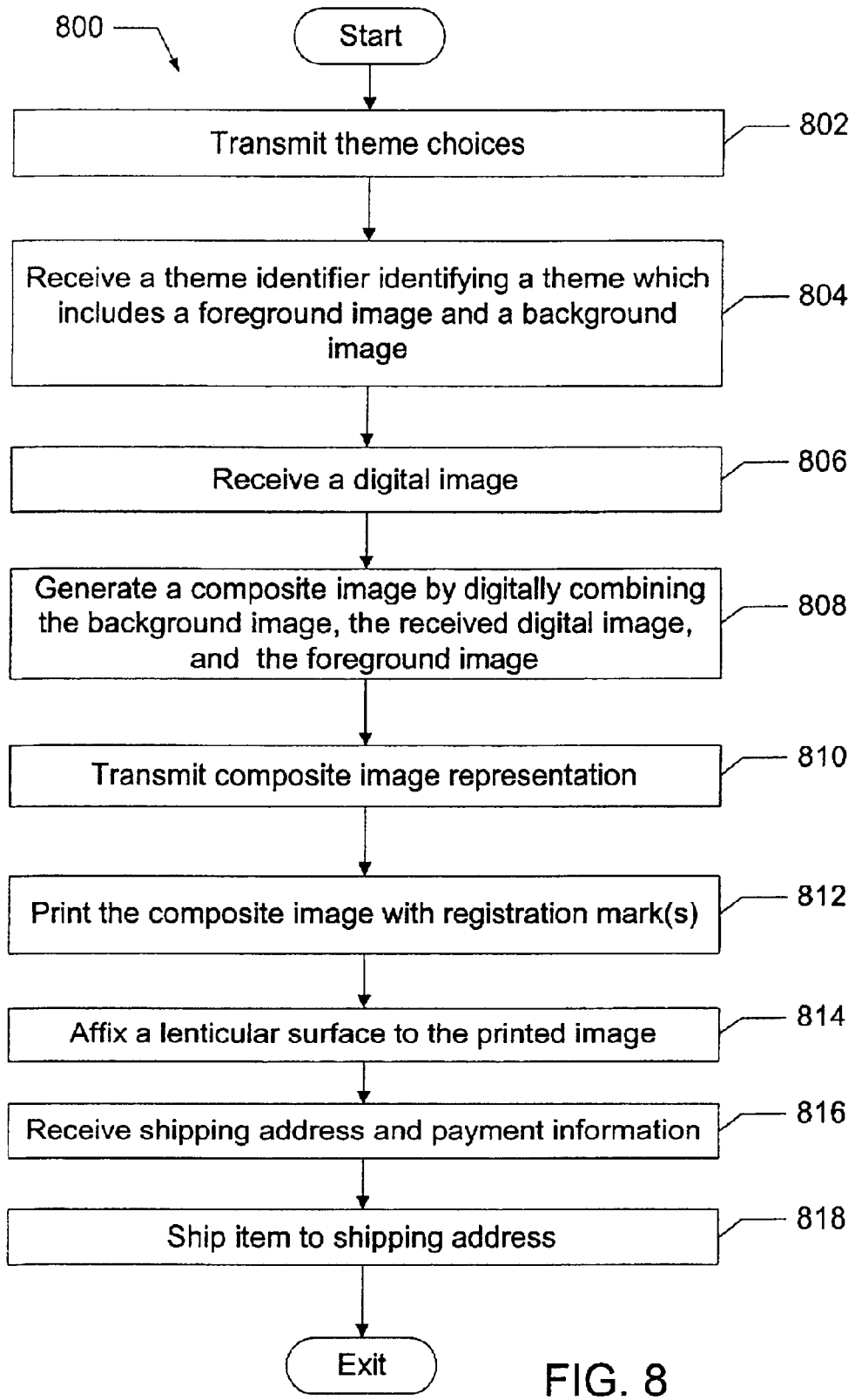
FIG. 8 is a flowchart of a process for producing a lenticular novelty item interactively via the Internet.

A flowchart of a process 800 for producing a lenticular novelty item interactively via the Internet is illustrated in FIG. 8. Preferably, the process 800 is embodied in a software program which is stored in a composite image generator memory 408, 414 and executed by the composite image generator CPU 404 in a well known manner. However, some or all of the steps of the process 800 may be performed manually and/or by another device. Although the process 800 is described with reference to the flowchart illustrated in FIG. 8, a person of ordinary skill in the art will readily appreciate that many other methods of performing the acts associated with process 800 may be used. For example, the order of many of the steps may be changed without departing from the scope or spirit of the present invention. In addition, many of the steps described are optional.

Generally, the process 800 causes the composite image generator 112 to receive a theme identifier, a captured digital image, shipping information, and payment information from the client device 202. Images associated with the selected theme and the captured digital image are then interlaced and/or combined to produce a final composite image. A representation of the final composite image may be transmitted to the client device 202 for review. If the final composite image is approved, a printed version 116 of the composite image is produced, and a lenticular surface 118 is applied to the printed image 116 to produce the lenticular novelty item 120. The lenticular novelty item 120 is then shipped to the shipping address.

The process 800 begins when the composite image generator 112 causes a network transmitter 410, 512 to transmit a plurality of theme choices to a client device 202 via a network 204 (step 802). The theme choices may include text and/or graphics indicative of the associated themes. A user at the client device 202 may then select a theme by selecting one of the text and/or graphics representations. As a result, the composite image generator 112 receives a theme identifier identifying a theme (step 804). In addition, the composite image generator 112 receives a digital image (e.g., a digital photo of a person) from the client device 202 (step 806).

Once the digital image is received, the image may be cropped or repositioned digitally to facilitate combing the digital image with other images from the selected theme. Preferably, alignment inputs are generated in response to arrow key depressions, mouse click and drag operations, and/or touch screen inputs at the location of the composite image generator 112 Once the digital image is aligned (if necessary), the composite image generator 112 preferably generates a composite image by digitally combining a background image, the captured digital image, and a foreground image (step 808). Preferably, the background image and the foreground image belong to the selected theme. In addition, the received digital image is preferably interlaced with an interior image from the selected theme.

Optionally, the composite image generator 112 may transmit a representation of the composite image to the client device 202 (step 810). As described above, in one embodiment, animation is used to simulate the appearance of the finished lenticular novelty item. In such an instance, software indicative of a slider or other control may be transmitted to the client device 202 to allow the user to move from frame to frame. In another embodiment, a single image representing the composite image is transmitted to the client device 202.

Once the composite image is generated, the composite image is preferably printed using a high resolution color printer 114 (step 812). Preferably, the printed image 116 includes registration marks of different colors as described above. Subsequently, a lenticular surface 118 is attached to the printed image 116 to produce the lenticular novelty item 120 (step 814). Preferably, the lenticular novelty item 120 is also laminated to remove any air bubbles and provide a protective layer.

At some point during the process 800, the composite image generator 112 preferably receives a shipping address and payment information (step 816). Preferably, the lenticular novelty item is shipped to the shipping address (step 818) if payment can be obtained using the payment information.

In summary, persons of ordinary skill in the art will readily appreciate that a method and apparatus for generating a multiple composite image has been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description, but rather by the claims appended hereto.

What is claimed is:

1. A method of generating a multiple composite image, the method comprising the steps of:
   interlacing a plurality of background images to produce a composite background image;
   interlacing a plurality of foreground images to produce a composite foreground image;
   capturing a digital image;
   interlacing the digital image with an interior image to produce a composite interior image;
   deleting a portion of the composite background image to create a specialized background image, the portion of the composite background image deleted being dependant on the composite interior image;
   deleting a portion of the composite interior image to create a specialized interior image, the portion of the composite interior image deleted being dependant on the composite foreground image; and
   digitally combining the specialized background image, the specialized interior image, and the composite foreground image to create the multiple composite image.

2. A method as defined in claim 1, further comprising the step of receiving a theme selection, the theme selection identifying the composite background image, the composite foreground image, and the interior image.

3. A method as defined in claim 2, further comprising the step of displaying a graphical representation of each of a plurality of predetermined themes on a display device operatively connected to a computing device, wherein the theme selection is received by the computing device.

4. A method as defined in claim 2, further comprising the step of transmitting a graphical representation of each of a plurality of predetermined themes to a computing device via the Internet, wherein the theme selection is received by the computing device.

5. A method as defined in claim 1, wherein the step of capturing a digital image comprises the step of capturing a person's face with a digital camera.

6. A method as defined in claim 1, further comprising the steps of printing the multiple composite image on a color printer and affixing a lenticular surface to the printed multiple composite image to produce a lenticular novelty item.

7. A method as defined in claim 6, further comprising the step of printing a lenticular registration mark on the printed multiple composite image, the lenticular registration mark facilitating rotational positioning and axial positioning of the lenticular surface on the printed multiple composite image.

8. A method as defined in claim 1, further comprising the steps of:
   displaying a graphical representation of the captured digital image on a computing device, the displayed graphical representation of the captured digital image having a screen position;
   displaying a graphical representation of the interior image on the computing device simultaneously with the display of the graphical representation of the captured digital image;
   receiving alignment inputs at the computing device; and
   adjusting the screen position of the graphical representation of the captured digital image in response to the alignment inputs.

9. A method as defined in claim 1, further comprising the steps of:
   displaying a graphical representation of the captured digital image on a computing device, the displayed graphical representation of the captured digital image having a size;
   displaying a graphical representation of the interior image on the computing device simultaneously with the display of the graphical representation of the captured digital image;
   receiving alignment inputs at the computing device; and
   adjusting the size of the graphical representation of the captured digital image in response to the alignment inputs.

10. A method as defined in claim 1, further comprising the step of displaying a plurality of two dimensional frames sequenced to produce a three dimensional illusion representing the multiple composite image.

11. A method as defined in claim 10, further comprising the step of receiving a user input, wherein the sequence of the plurality of two dimensional frames is determined in response to the user input.

12. An apparatus for generating a multiple composite image, the apparatus comprising:
   a memory device storing a software program, a composite background image, a composite foreground image, and an interior image;
   a digital camera structured to capture a digital image; and
   a controller operatively coupled to the memory device and the digital camera, the controller being structured to execute the software program, the software program being structured to cause the controller to:
   retrieve the composite background image, the composite foreground image, and the interior image from the memory device;
   receive the digital image from the digital camera;
   interlace the digital image with the interior image to produce a composite interior image;
   delete a portion of the composite background image, the portion of the composite background image deleted being dependant on the composite interior image;

delete a portion of the composite interior image, the portion of the composite interior image deleted being dependant on the composite foreground image; and combine at least a portion of the composite background image, at least a portion of the composite foreground image, and at least a portion of the composite interior image to create the multiple composite image.

13. An apparatus as defined in claim 12, wherein the software program is further structured to cause the controller to receive a theme selection, the theme selection identifying the composite background image, the composite foreground image, and the interior image.

14. An apparatus as defined in claim 13, wherein the software program is further structured to cause the controller to generate a display signal of a graphical representation of each of a plurality of predetermined themes on a display device operatively connected to the controller.

15. An apparatus as defined in claim 12, wherein the software program is further structured to cause the controller to generate a display signal of a graphical representation of each of a plurality of predetermined themes for transmission via the Internet.

16. An apparatus as defined in claim 12, wherein the software program is further structured to cause the controller to generate a print signal indicative of the multiple composite image.

17. An apparatus as defined in claim 12, wherein the software program is further structured to cause the controller to generate a print signal indicative of a lenticular registration mark which facilitates rotational positioning and axial positioning of a lenticular surface.

18. A computer readable medium storing a software program for generating a multiple composite image, the software program being structured to cause a computing device to:

retrieve a composite background image, a composite foreground image, and an interior image from a memory device;

receive a digital image from a digital camera;

interlace the digital image with the interior image to produce a composite interior image;

delete a portion of the composite background image, the portion of the composite background image deleted being dependant on the composite interior image;

delete a portion of the composite interior image, the portion of the composite interior image deleted being dependant on the composite foreground image; and combine at least a portion of the composite background image, at least a portion of the composite foreground image, and at least a portion of the composite interior image to create the multiple composite image.

19. A computer readable medium as defined in claim 18, wherein the software program is further structured to cause the computing device to receive a theme selection, the theme selection identifying the composite background image, the composite foreground image, and the interior image.

20. A computer readable medium as defined in claim 18, wherein the software program is further structured to cause the computing device to generate a print signal indicative of a lenticular registration mark which facilitates rotational positioning and axial positioning of a lenticular surface.

* * * * *